United States Patent
Felt

[11] 3,892,418
[45] *July 1, 1975

[54] SEAL RING
[75] Inventor: Maurice D. Felt, Carson City, Nev.
[73] Assignee: Sacomo Sierra Inc., Carson City, Nev.
[ * ] Notice: The portion of the term of this patent subsequent to Apr. 4, 1989, has been disclaimed.
[22] Filed: Apr. 4, 1973
[21] Appl. No.: 347,836

[52] U.S. Cl............................ 277/205; 277/212 C
[51] Int. Cl.²......................................... F16J 15/24
[58] Field of Search............ 277/205, 212 R, 212 C

[56] References Cited
UNITED STATES PATENTS
3,653,672  4/1972  Felt.................................. 277/205

FOREIGN PATENTS OR APPLICATIONS
557,047  3/1960  Belgium............................ 277/205

Primary Examiner—Richard E. Aegerter
Assistant Examiner—Willis Little
Attorney, Agent, or Firm—Robert G. Slick

[57] ABSTRACT

A one piece seal ring is provided having rounded lips wherein the top point of sealing is below the top of the ring and the ring has a large area in contact with the sealing surface. The seal ring has a narrow, hollow center portion and no filler strip is employed in the center of the ring.

1 Claim, 3 Drawing Figures

SEAL RING

SUMMARY OF THE INVENTION

"U" ring-type flexible seals are for use in sealing dynamic and static hydraulic or gas applications for prevention of internal and external leakage. U seals are pressure energized with pressure against the open end of the "U" acting equally on the inner surface in all directions, statically balancing the seal. U seals are normally assembled with an interference fit allowing a positive, relatively low, initial compression. U ring-type seals provide good sealing with low friction at low to moderate pressures, however, as pressure increases frictional wear of the heel — or extrusion of the heel — are quite likely to be accelerated with subsequent failure of the sealing lip(s).

It is an object of the present invention to provide an improved configuration over that shown in my former U.S. Pat. No. 3,653,672 which will maintain a long wearing seal at low and accelerated pressures without premature failure of the sealing lips and the lips, with their bulk in the rounded leading edge, will also maintain their seal as the base or heel of the cup wears or extrudes into the clearance gap between the piston and cylinder wall or the clearance gap between the rod and stuffing box gland. Test have verified that as the heel wears and/or extrudes the configuration of this invention it will cause the upper portion of the sealing lips to lower proportionately as the heel material is lost without failing by tearing, fracturing or flop over, retaining an adequate ability to seal the pressure medium, substantially reducing the potential possibility of failure.

The sealing ring of the present invention, in common with the ring of my prior U.S. Pat. No. 3,653,672, has a number of advantages over sealing rings heretofore known. The sealing ring has rounded lips wherein the point of contact between the ring and the wall being sealed is well below the top of the ring. The rounded leading edges are also helpful during installation allowing the rings to be installed without special tools and lessening the possibility of nicking or cutting the lips. This is a design consideration only.

Most of the initial wear on a U cup is on the heel of the cup. As the heel wears it can allow the thinner walls of the lips to fracture or blow by and turn. The heel can also extrude into the clearance gap (when clearance is excessive or pressures high) between the piston and cylinder wall or rod and stuffing box gland. When this happens the lip can turn back or fracture. Extrusion or cold flow is minimized in the design of the present invention.

The rounded leading edges of the ring of the present invention seal effectively at low pressures with normal interference. At high pressures a very effective seal is maintained and with the unique design of the wedge shaped lips the seal can be maintained even with severe wear and extrusion of the heel portion of the cup.

Under extremely severe pressures, shock loads, poor surface finishes, etc, the performance can be even further enhanced by adding more bulk to the heel of the cup, i.e. making the overall height greater than the nominal cross section but leaving the design of the lips the same as in the standard square cup. This will give more wear surface to the heel, reduce the tendency to extrude and prevent modification of the stress distribution to the lips of the cup.

U type seals frequently use a "filler" strip or ring enclosed in the interior or protruding slightly above the lips of the U.

In my prior U.S. Pat. No. 3,653,672 I described and claimed an improved form of seal ring which is satisfactory for many purposes. The present invention constitutes an improvement over the seal ring disclosed in my U.S. Pat. No. 3,653,672 in that it does not employ a filler strip and thus is entirely of one piece construction. At the present time various hydraulic fluids are employed and many of these react with certain of the plastic materials which are employed in seal rings. The problem is aggravated by the filler strip since it is ordinarily of a relatively soft material, while the ring proper is of a harder material. Thus, two separate materials have to be used in combination with each other, making it more difficult to find a combination of plastics or elastomers which will not react or be damaged by a wide variety of hydraulic fluids. Further, the filler strip requires a separate manufacturing operation to fabricate the strip so that it adds to the cost, both from the fabrication standpoint and a material standpoint. Further, it is necessary to perform an assembly operation to assemble the strips into the ring.

The present invention is a generally improved structure wherein the seal ring is made entirely in one piece, eliminating the filler strip. Thus, the compatibility problem of finding two separate plastics or elastomers which are inert to a wide variety of hydraulic fluids, as well as the extra expense of making the strip, are eliminated. In general, the objects of the present invention are achieved by changing the geometry of the ring.

The U type seal rings used in the past, as discussed above, employ a filler strip or ring and the purpose of this filler strip is to act as a spring to further increase the initial contact or interference of the lips of the seal at installation. This prevents the bypass of fluid or gas of low pressures as well as during operation. In accordance with the present invention, the strip has been eliminated by making the slot between the arms of the U smaller than the excess of the overall width of the ring with respect to a nominal clearance, so that when the ring is installed, the two cheeks of the U-shaped member will be forced together to flatten their surfaces somewhat and exerting pressure outwardly on the part to be sealed, forming a very secure seal, even at low pressures and/or when tolerances are excessive.

Some prior art sealing rings also have required the special provision of an undercut in the heel to permit stacking when multiple rings are employed. The design of the present ring is such that a flat heel may be used without interfering with stacking, thus adding to the strength of the ring.

Other features of the present invention will be apparent from the balance of the specification.

DESCRIPTION OF THE PREFERRED EMBODIMENTS

Figure 1:
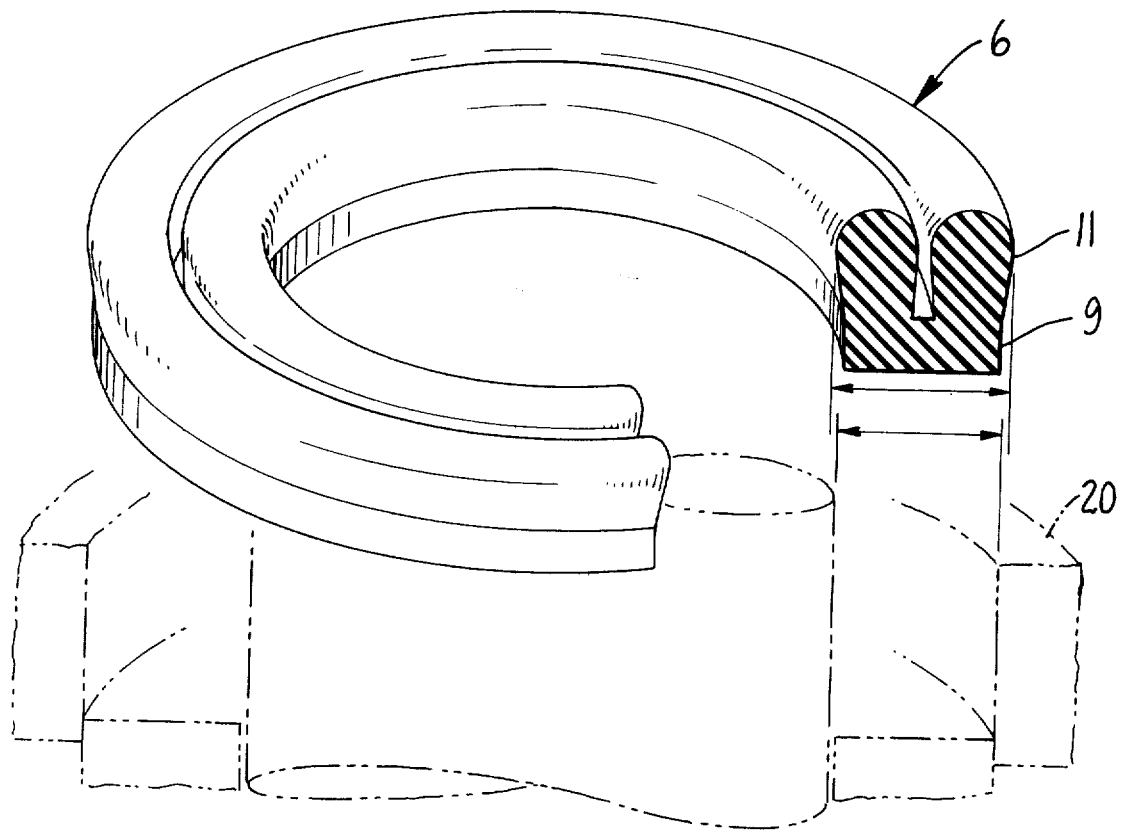
FIG. 1 is a perspective view of a sealing ring embodying the present invention, partly in section.

Referring now to the drawings by reference characters, there is shown in FIG. 1 a packing or sealing ring generally designated 6. The sealing ring 6 can be made of any suitable resilient material as is well known to those skilled in the art such as polyester or polyether castable urethane compounds, preferably having a relatively high Shore A durometer range, such as 90 to 95. Other elastomeric compounds may be used such as neoprene, natural rubber or a synthetic rubber such as Buna-N. Reinforcing materials such as duck and similar fabrics may or may not be used. One particularly suitable material consists of a polyurethane resin impregnated with molybdenum disulfide.

Describing the ring now in detail, the ring has a base portion 9 and shoulders 11, the base extending generally from the line designated A to the line designated B and the shoulders extending from line B to line C. Such rings are ordinarily designed for a nominal clearance i.e. the expected clearance between two parts to be sealed, such as between a piston and a cylinder wall and/or rod and stuffing box, and this dimension is hereinafter referred to as "nominal". In the embodiment illustrated, the distance from A to C, i.e. the overall height of the ring was about equal to nominal. The top of the shoulder 11 is rounded as at 13 and the combined width of the shoulders extending from the line D to the line E and is slightly larger than nominal, in this case being 1.10 times nominal. The base 9 which extends between the lines F and G is ordinarily slightly smaller than nominal and in this case was 97 percent of the nominal.

Figure 2:
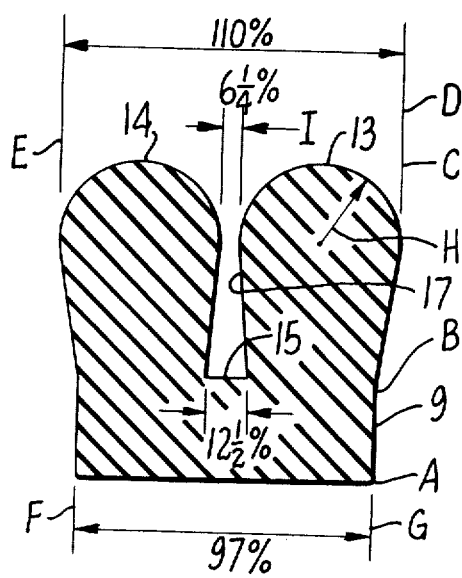
FIG. 2 is an enlarged cross section of the sealing ring of FIG. 1.

The shoulders 11 extend upwardly from a root 15 and the width of this root is about 12½ percent of the nominal diameter and the root depth is about 70 percent of nominal. The inner walls of the shoulders taper inwardly as at 17 and the clearance between them, at their closest approach, designated point I on FIG. 2, is about 6¼ percent nominal. The outer wall of the shoulders 11 taper outwardly as shown from the point B which is about 97 percent of nominal to the widest point, i.e. the distance between E and D which is about 110 percent nominal. The shoulders 11 have top portions 13 and 14 and these are curved substantially to 180° as shown. The radius of the curve is shown by the arrow H.

It will thus be seen that the clearance between the two innermost points of the U designated I is less than the excess at the widest point, i.e. the difference between D and E and the nominal diameter. In the example shown the widest point is 10 percent greater than nominal while the distance F is only 6¼ percent nominal. Thus, as the sealing ring of the present invention is placed in a stuffing box as is shown in FIG. 3, the arms of U will not only completely close, but will become somewhat flattened.

Figure 3:
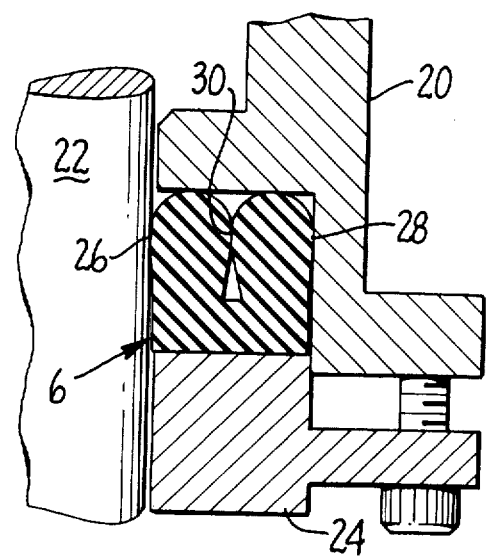
FIG. 3 is a sectional view showing the sealing ring of the present invention in use.

Referring to FIG. 3, the ring 6 is shown forming a seal between a stuffing box 20 and a rod 22, and is held in place by a retaining ring 24. As can be seen, the sides of the U ring have been flattened as at 26 and 28 and the space between the two arms of the U has not only been completely closed, but the two cheeks have been actually flattened against each other as at 30.

In a preferred embodiment of the invention as previously described, the overall width of the cross section of the ring is 110 percent nominal, the base of the root is 12½ percent and the distance between the arms of the U at the narrowest point is 6¼ percent of nominal. Although these exact dimensions represent a preferred embodiment, it is not necessary that the ring have these precise measurements. It is important that the difference between the nominal clearance and the actual width of a cross section of the ring be greater than the distance between the narrowest point between the arms of the U so that the U will be fully closed, and preferably somewhat compressed, when the ring is installed. Also, it is preferred that the root be about twice the distance between the uncompressed arms of the U at their closest point.

I claim:

1. In a sealing ring having a cross sectional configuration consisting of a generally rectangular base having a flat bottom portion and two shoulders of equal height extending generally upward from said flat base, said shoulders forming the arms of a U, said shoulders having a space between them extending upwardly from a root, the outward surface of the said shoulders tapering outwardly from the level of the root and the upper surfaces of said shoulders being symmetrically rounded 180°, the improvement comprising a ring designed for nominal dimension, said ring having an uncompressed cross sectional width substantially greater than said nominal dimension and said shoulders having an open space between them wherein the space between the shoulders is substantially less than the difference between said nominal dimension and the actual distance between the extremities of said shoulders in an unstretched condition whereby said U will close and flatten the abutting surfaces of said shoulders when said ring is installed in a space substantially equal to said nominal dimension, said ring having an unstressed cross sectional width of about 110 percent nominal, said root having a width of about 12½ percent nominal and the distance between the shoulders being about 6¼ percent nominal at their closest approach.

* * * * *